US006289187B1

(12) United States Patent
Swift et al.

(10) Patent No.: US 6,289,187 B1

(45) Date of Patent: Sep. 11, 2001

(54) CARBON FIBER COMMUTATOR BRUSH FOR A TONER DEVELOPING DEVICE AND METHOD FOR MAKING

(75) Inventors: Joseph A. Swift, Ontario; John R. Andrews, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/244,148

(22) Filed: Feb. 4, 1999

(51) Int. Cl.$^{7}$ .............................. G03G 15/00; B32B 3/02

(52) U.S. Cl. .................................................. 399/90; 428/88

(58) Field of Search ............................ 399/90, 290, 291; 428/88, 293.1

(56) References Cited

U.S. PATENT DOCUMENTS 5,139,862 8/1992 Swift et al. .......................... 428/294
5,177,529 * 1/1993 Schroll et al. ..................... 399/91 X
5,250,756 10/1993 Swift et al. ...................... 174/119 R
5,270,106 12/1993 Orlowski et al. .................... 428/295
5,289,240 2/1994 Wayman ............................. 355/259
5,599,615 2/1997 Swift et al. ...................... 428/293.1
5,794,100 8/1998 Bell et al. ............................. 399/90
5,812,908 9/1998 Larocca et al. ........................ 399/90
5,885,683 * 3/1999 Swift ..................................... 428/88

* cited by examiner

*Primary Examiner*—Fred L Braun
(74) *Attorney, Agent, or Firm*—H. Fleischer

(57) ABSTRACT

A commutator brush having carbon fibers encased in a resin matrix and extending outwardly therefrom and a method of making thereof. The carbon fibers are cold cut by a laser beam to minimize heating thereof. The commutative brush is in wiping contact with electrodes on a donor roll used in a development system of an electrophotographic printing machine.

21 Claims, 4 Drawing Sheets

CARBON FIBER COMMUTATOR BRUSH FOR A TONER DEVELOPING DEVICE AND METHOD FOR MAKING

This invention relates generally to a development system adapted for use in an electrophotographic printing machine, and more particularly concerns an improved commutator brush for use therein.

Generally, the process of electrophotographic printing includes charging a photoconductive surface to a substantially uniform potential and selectively discharging areas by exposure to light, thereby forming an electrostatic latent image of an original document being created. The electrostatic latent image is developed by bringing a developer material into contact therewith. Two component and single component developer materials are frequently used. A typical two component developer material has magnetic carrier particles with toner particles adhering triboelectrically thereto. A single component developer material typically comprises toner particles. Toner particles are attracted to the latent image, forming a toner powder image on the photoconductive surface. The toner powder image is subsequently transferred to a sheet of support material. Finally, the toner powder image is heated to permanently fuse it to the sheet in image configuration.

One type of single component development system is a scavengeless, or non-interactive development system that uses a donor roll for transporting charged toner to the development zone. A plurality of electrode wires are closely spaced to the donor roll in the development zone. An AC voltage is applied to the wires forming a toner cloud in the development zone. The electrostatic fields generated by the latent image attract toner from the toner cloud to develop the latent image. A hybrid scavengeless development unit employs a magnetic brush developer roller for transporting carrier having toner particles adhering triboelectrically thereto. The donor roll and magnetic roll are electrically biased relative to one another. Toner is attracted to the donor roll from the magnetic roll. The electrically biased electrode wires detach the toner from the donor roll forming a toner powder image in the development zone. The latent image attracts toner particles thereto from the toner powder cloud. In this way, the latent image recorded on the photoconductive surface is developed with toner particles.

In order to alleviate the problems associated with the use of electrically activated wires in the development zone, an electroded or commutated donor roll is used. This eliminates the contamination and vibrational instabilities associated with the use of individual wires for detaching the toner from the surface of the donor roll. However, it has been found that when an electroded donor roll is employed, electrical discharges frequently occur at the points of high voltage electrical commutation.

In order to improve the performance of the development system, it has been found that the stationery commutator having a brush contacting the electrodes on the donor roll must reliably transmit complex high voltage wave forms to the narrow electrode pads of the rotating donor roll without distortion to, or deterioration of, the wave form.

The commutator brush is typically a conductive fiber brush made of conductive fibers protruding from a composite plastic or a solid graphite brush. Typically, only the electrode in the nip between the donor roll and the photoconductive surface is electrically biased. As the donor roll rotates, the electrodes in the nip contact the brush. The use of a stationery commutator brush in contact with the electrodes on the periphery of the donor roll has problems. Many materials for the contact brush have been considered, including metal and non-metal materials. A carbon fiber brush and a solid graphite brush have been found to be most successful. Inasmuch as the brush is in rubbing contact with the electrodes on the donor roll, the electrodes wear and reduce the life of the expensive donor roll. The abrupt connection and disconnection of the brush with the respective electrodes on the donor roll create electrical noise and arcing between the brush and the electrode. This may further reduce the life of the donor roll. In addition, brushes hereinbefore manufactured were excessively heated during the mechanical or laser cutting process. This resulted in a degradation of the mechanical and electrical properties of the brush.

Various types of brushes have hereinbefore been developed. The following disclosures may be relevant to certain aspects of the present invention:

U.S. Pat. No. 5,139,862

Patentee: Swift et al.

Issued: Aug. 18, 1992

U.S. Pat. No. 5,250,756

Patentee: Swift et al.

Issued: Oct. 5, 1993

U.S. Pat. No. 5,270,106

Patentee: Orlowski et al.

Issued: Dec. 14, 1993

U.S. Pat. No. 5,289,240

Patentee: Wayman

Issued: Feb. 22, 1994

U.S. Pat. No. 5,599,615

Patentee: Swift

Issued: Feb. 4, 1997

U.S. Pat. No. 5,794,100

Patentee: Bell et al.

Issued: Aug. 11, 1998

U.S. Pat. No. 5,812,908

Patentee: Larocca et al.

Issued: Sep. 22, 1998

The disclosures of the above-identified patents may be briefly summarized as follows:

U.S. Pat. Nos. 5,139,862; 5,270,106; 5,599,615; 5,794,100; and 5,812,908 all describe various types of carbon fiber brushes which may be used for electrically contacting a rotating member.

U.S. Pat. No. 5,250,756 discloses a carbon fiber brush encased in a resin binder. A laser is used to cut individual components for use as electrical contacts. The laser cuts the resin and carbon fibers to form a contact region of the desired length. The types of lasers that may be used include a carbon dioxide laser, a carbon monoxide laser, a YAG laser, or an argon ion laser.

U.S. Pat. No. 5,289,240 discloses a commutator brush which is adapted to contact electrodes on a donor roll in a development system. The commutator brush may include a central portion of filaments bounded on each side by boundary filaments. The filaments in the boundary portions are of a higher resistivity than the filaments in the central portion. The filaments may be made from carbon fibers.

Pursuant to the features of the present invention, there is provided an electrical component having at least one end for electrically contacting another component. The electrical component includes a support and a plurality of electrically conductive fibers having at least a portion thereof extending outwardly from the support to form a brush-like structure. The brush-like structure has a free end adapted to contact the other component with the free end being cold cut by a laser beam so as to minimize heating of the fibers being cut.

In accordance with another aspect of the present invention, there is provided a method of making an electrical component having at least one end for electrically contacting another component. The method includes feeding a plurality of carbon fiber layers into a mold and surrounding the carbon fiber layers in the mold with a resin material. The carbon fiber layers are then cut along opposed front and rear surfaces. A conductive adhesive is applied to the rear face to bond the carbon fibers to one another. The front face is cold cut to form a brush contact region.

In still another aspect of the present invention, there is provided an apparatus for depositing developer material on a surface to develop a latent image recorded thereon. The apparatus includes a donor roll spaced from the surface and adapted to advance developer material to the latent image recorded on the surface. A plurality of electrodes are disposed on the donor roll. A commutator contacts the electrodes along the exterior circumferential surface of the donor roll. The commutator comprises a plurality of electrically conductive fibers to form a brush-like structure having a free end adapted to contact the electrodes. The free end is cold cut by a laser beam so as to minimize heating of the fibers being cut.

Other aspects of the present invention will become apparent as the following description proceeds and upon reference to the drawings, in which.

While the present invention will hereinafter be described in connection with a preferred embodiment and method of use thereof, it will be understood that it is not intended to limit the invention to that embodiment or method of use. On the contrary, it is intended to cover all alternatives, modifications, and equivalents that may be included within the spirit and scope of the invention as defined by the appended claims.

Figure 5:
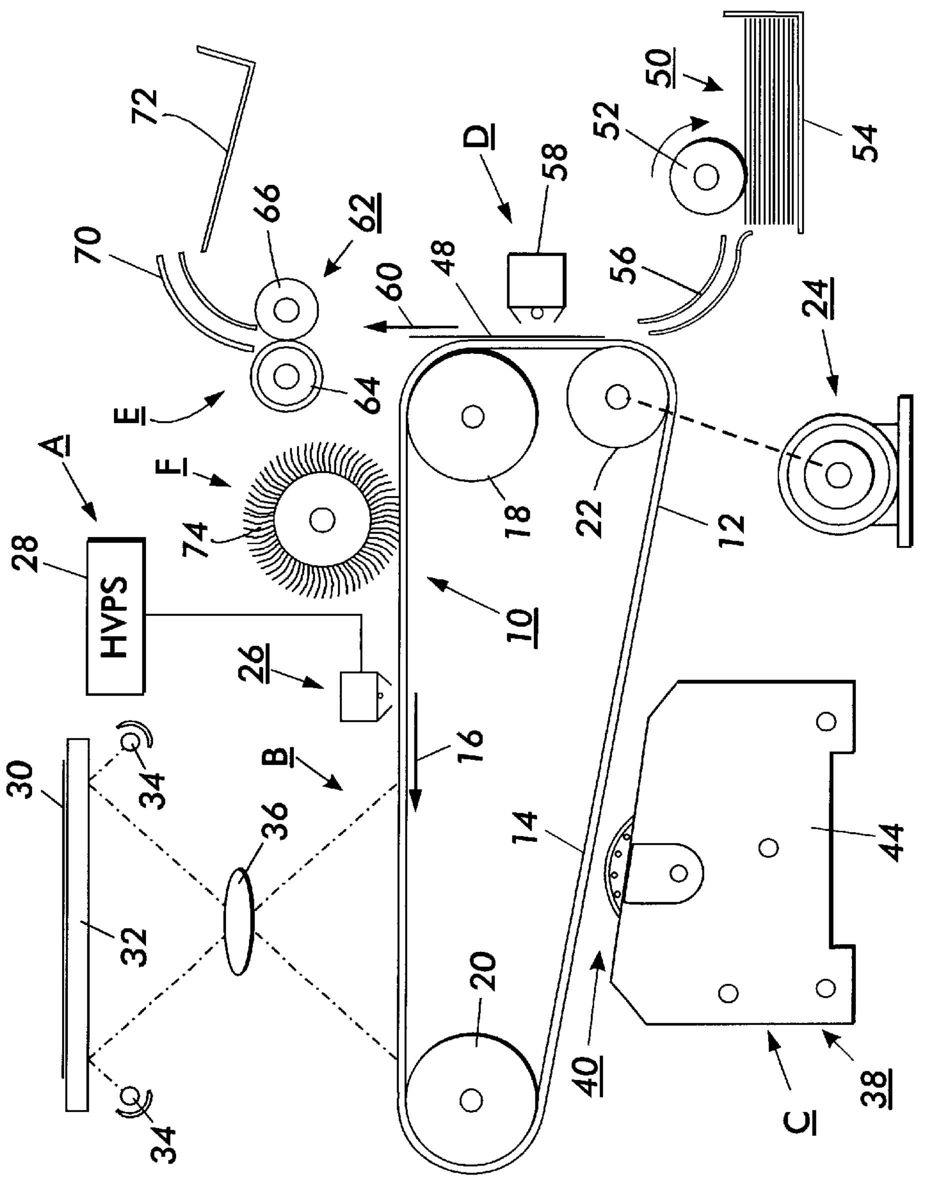
FIG. 5 is a schematic elevational view of an electrophotographic printing machine incorporating a development system having the commutator brush of the present invention therein.

For a general understanding of the features of the present invention, reference is made to the drawings. In the drawings, like reference numerals have been used throughout to designate identical elements. FIG. 5 schematically depicts the various elements of an illustrative electrophotographic printing machine incorporating the development apparatus having the commutator brush of the present invention therein. It will become evident from the following discussion that this commutator brush is equally well suited for use in a wide variety of applications and is not necessarily limited in its application to the particular embodiment depicted herein or the method of manufacture described herein.

Inasmuch as the art of electrophotographic printing is well-known, the various processing stations employed in the FIG. 5 printing machine will be shown hereinafter schematically and their operation described briefly with reference thereto.

Referring initially to FIG. 5, there is shown an illustrative electrophotographic printing machine incorporating the development apparatus having the commutator brush of the present invention therein. The electrophotographic printing machine employs a belt 10 having a photoconductive surface 12 deposited on an electrically grounded substrate 14. One skilled in the art will appreciate that any suitable photoconductive material may be used. Belt 10 moves in the direction of arrow 16 to advance successive portions of photoconductive surface 12 sequentially through the various processing stations disposed about the path of movement thereof. Belt 10 is entrained about stripping roller 18, tensioning roller 20, and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt. Belt 10 is maintained in tension by a suitable pair of springs (not shown) resiliently urging tensioning roller 20 against belt 10 with the desired spring force. Stripping roller 18 and tensioning roller 20 are mounted to rotate freely. Initially, a portion of belt 10 passes through charging station A. At charging station A, a corona generating device, indicated generally by the reference numeral 26, charges photoconductive surface 12 to a relatively high, substantially uniform potential. High voltage power supply 28 is coupled to corona generating device 26. Excitation of power supply 28 causes corona generating device 26 to charge photoconductive surface 12 of belt 10. As the photoconductive surface 12 of belt 10 is charged, the charged portion thereof is advanced through exposure station B. At exposure station B, an original document 30 is positioned face down upon a transparent platen 32. Lamps 34 flash light rays onto original document 30. The light rays reflect from original document 30 a transmitter through lens 36 forming a light image thereof. Lens 36 focuses the light image onto the charged portion of photoconductive surface 12 to selectively dissipate the charge thereof. This records an electrostatic latent image on photoconductive surface 12 which corresponds to the informational areas contained within original document 30 disposed upon transparent platen 32. Thereafter, belt 10 advances the electrostatic latent image recorded on photoconductive surface 12 to development station C.

One skilled in the art will appreciate that a raster input scanner (RIS) and a raster output scanner (ROS) may be used instead of the light lens system heretofore described. The RIS contains document illumination lamps, optical lens, and mechanical scanning mechanism and photosensing elements such as charge coupled device arrays (CCD). The RIS captures the entire image from the original document then converts it to a series of raster scan lines. These raster scan lines are output from the RIS and function as the input to the ROS. The ROS performs the function of creating the output copy of the image and lays out the image in a series of horizontal lines with each line having a specific number of pixels per inch. These lines illuminate the charged portion of the photoconductive surface to selectively discharge the charge thereon. An exemplary ROS has lasers with rotating polygon mirror blocks, solid state modulator bars and mirrors. Still another type of exposure system would merely utilize a ROS with the ROS being controlled by the output from an electronic subsystem (ESS) which prepares and manages the image data flow between a computer and the ROS. The ESS is the controller electronics for the ROS and maybe a self-contained, dedicated mini-computer.

After the electrostatic latent image has been recorded on photoconductive surface 12, belt 10 advances the latent image to development station C. At development station C, a developer unit, indicated generally by the reference number 38, develops the latent image recorded on the photoconductive surface 12. Preferably, developer unit 38 includes one or more donor rolls 40 having a plurality of integral electrical conductors or electrodes disposed thereon. The electrodes are substantially equally spaced and located on the external surface of donor roller 40. A commutator brush 114 (FIG. 6) electrically activates the electrodes with a high voltage AC potential to detach donor particles from the surface of donor roll 40. In this way, a toner powder cloud is created in the gap between donor roller 40 and photoconductive surface 12. The latent image recorded on photoconductive surface 12 attracts toner particles from the toner powder cloud developing a visible toner powder image thereon. Donor roller 40 is mounted, at least partially, in the chamber of developer housing 44. The chamber of developer housing 44 stores a supply of two component developer material therein. The two component developer material consists of at least carrier granules having toner particles adhering triboelectrically thereto. A magnetic roller disposed wholly within the chamber of housing 44 conveys the developer material to the donor roll. The magnetic roller is electrically biased relative to the donor roll so that the toner particles are attracted from the magnetic roll to the donor roll at a loading zone. Developer unit 38 will be discussed hereinafter in greater detail with reference to FIG. 6.

With continued reference to FIG. 5, after the electrostatic latent image is developed, belt 10 advances the toner powder image to transfer station D. A sheet of support material 48 is advanced to transfer station D by sheet feeding apparatus 50. Preferably, sheet feeding apparatus 50 includes a feed roll 52 contacting the uppermost sheet of stack 54. Feed roll 52 rotates to advance the uppermost sheet from stack 54 into chute 56. Chute 56 directs the advancing sheet of support material into contact with photoconductive surface 12 of belt 10 in a timed sequence so that the toner powder image developed thereon contacts the advancing sheet at transfer station 58 which sprays ions into the back surface of sheet 48. This attracts the toner powder image from photoconductive surface 12 to sheet 48. After transfer, sheet 48 continues to move in the direction of arrow 60 onto a conveyor (not shown) which advances sheet 48 to fusing station E.

Fusing station E includes a fuser assembly, indicated generally by the reference numeral 62, which permanently affixes the transferred powder image to sheet 48. Fuser assembly 62 includes a heated fuser roller 64 and a back-up roller 66. Sheet 48 passes between fuser roller 64 and back-up roller 66 with the toner powder image contacting fuser roller 64. In this manner, the toner powder image is affixed to sheet 48. After fusing, sheet 48 advances through chute 70 to catch tray 72 for subsequent removal from the printing machine by the operator.

After the sheet is separated from photoconductive surface 12 of belt 10, the residual toner particles adhering to photoconductive surface 12 are removed therefrom at cleaning station F. Cleaning station F includes a rotatably mounted fibrous brush 74 in contact therewith. Subsequent to cleaning, a discharge lamp (not shown) floods photoconductive surface 12 with light to dissipate any residual electrostatic charge prior to recharging the photoconductive surface for the next successive imaging cycle.

Figure 6:
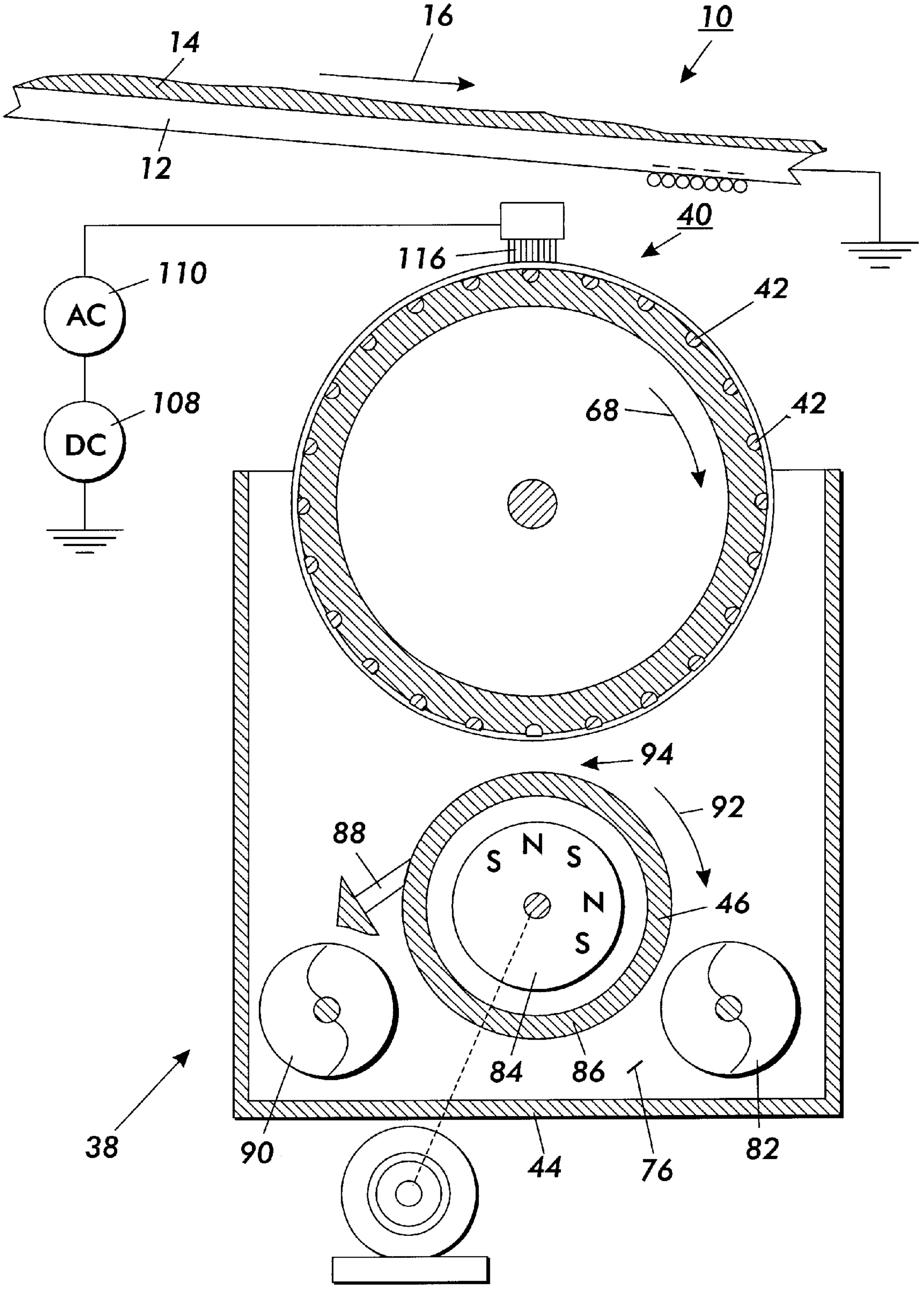
FIG. 6 is a schematic elevational view of the development system shown in FIG. 5 and incorporating the commutator brush of the present invention therein.

Referring now to FIG. 6, there is shown developer unit 38 in greater detail. As shown thereat, developer unit 38 includes a housing 44 defining a chamber 76 for storing a supply of developer material therein. Donor roll 40 has electrical conductors 42 in grooves about the peripheral circumferential surface thereof. The electrical conductors are substantially equally spaced from one another and insulated from the body of donor roll 40 which is electrically conductive. Donor roll 40 rotates in the direction of arrow 68. A magnetic roll 46 is also mounted in chamber 76 of developer housing 44. Magnetic roller 46 is shown rotating in the direction of arrow 92. Magnetic roller 46 and portions of donor roll 40 may be electrically biased relative to each other by AC and/or DC voltages as required, by means not shown, in order to affect loading of toner particles from magnetic roller 46 to the surface of donor roll 40. One possible configuration of AC and DC electrical biasing in such a developer unit is shown in U.S. Pat. No. 5,172,170, the relevant portions thereof being hereby incorporated by reference. In the development zone, voltage sources 108 and 110 electrically bias electrical conductors 42 to a DC voltage having an AC voltage superimposed thereon. Voltage sources 108 and 110 are in wiping contact with electrodes 42 in the development zone by means of commutator brush 114. The details of commutator brush 114 and the method of manufacture thereof will be discussed hereinafter with reference to FIGS. 1–4, inclusive. As donor roll 40 rotates in the direction of arrow 68, successive electrodes 42 advance into the development zone and are electrically biased by voltage sources 108 and 110. In this way, an AC voltage difference is applied between the electrodes on the donor roll and the photoconductive surface detaching toner from the donor roll and forming a toner powder cloud. Magnetic roller 46 advances a constant quantity of toner particles to donor roll 40. Metering blade 88 is positioned closely adjacent magnetic roller 46 to maintain the compressed pile height of the developer material on magnetic roller 46 at the desired level. Magnetic roller 46 includes a non-magnetic tubular member 86 made preferably from aluminum and having the exterior circumferential surface thereof roughened. An elongated magnet 84 is positioned interiorally of and spaced from the tubular member. The magnet is mounted stationarily. The tubular member rotates in the direction of arrow 92 to advance the developer material adhering thereto into a loading zone 94. In loading zone 94, toner particles are attracted from the carrier granules on the magnetic roller to the donor roller. Augers 82 and 90 are mounted rotatably in chamber 76 to mix and transport developer material. The augers have blades extending spirally outwardly from a shaft. The blades are designed to advance the developer material in a direction substantially parallel to the longitudinal axis of the shaft.

Commutator brush 114 includes a plurality of filaments which contact a portion of the circumferential surface of donor roll 40. In this way, electrodes 42 in the development zone adjacent photoconductive surface 12 of belt 10 are energized by the AC voltage source and the DC voltage source. The commutator brush selectively energizes only those electrodes 42 in the development zone. This electrical biasing causes toner particles on the surface of donor roll 42 to move into the development zone forming a toner powder cloud adjacent the photoconductive surface. Toner particles from the toner powder cloud are attracted to the latent image so as to develop it.

Figure 1:
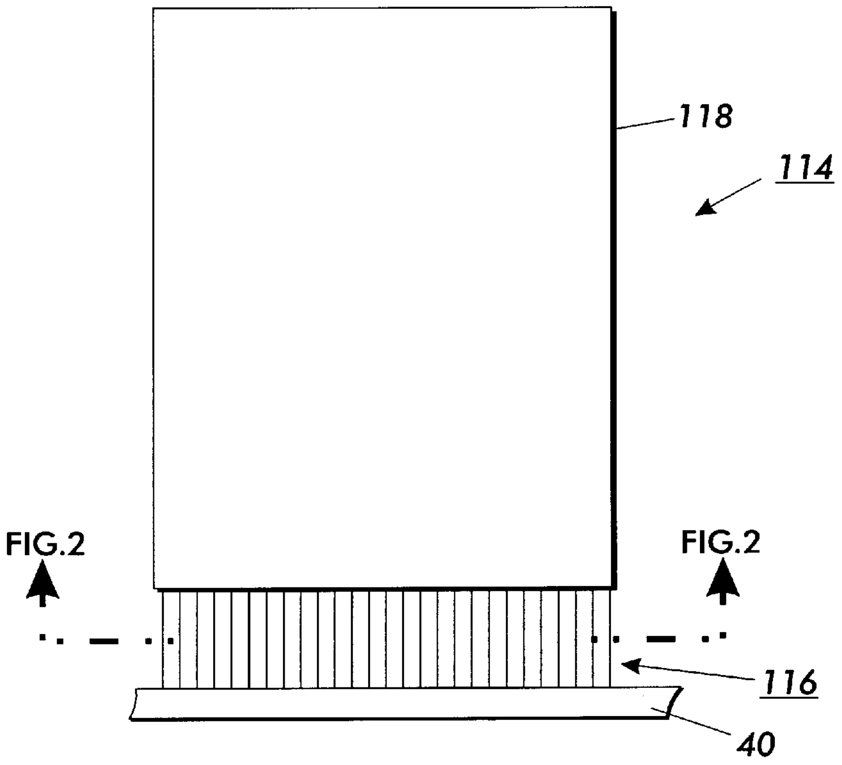
FIG. 1 is a schematic elevational view showing the commutator brush of the present invention.

Turning initially to FIG. 1, commutator brush 114 includes a multiplicity of carbon fibers 116 extending outwardly from support 118. Preferably, support 118 is a resin matrix surrounding carbon fibers 116. This results in a multiplicity of carbon fibers being contained within the resin matrix with their free ends being exposed to provide an electrical contact. Any suitable resin matrix may be employed. Typically, the polymer selected for the resin is chosen from the group of structural thermoplastic and thermosetting resins. Polyesters, epoxys, vinyl esters, polypropylene and Nylon are, in general, suitable materials with polyesters and vinyl esters being preferred polymers due to their short cure time, relative chemical inertness, and suitability for laser processing.

Figure 2:
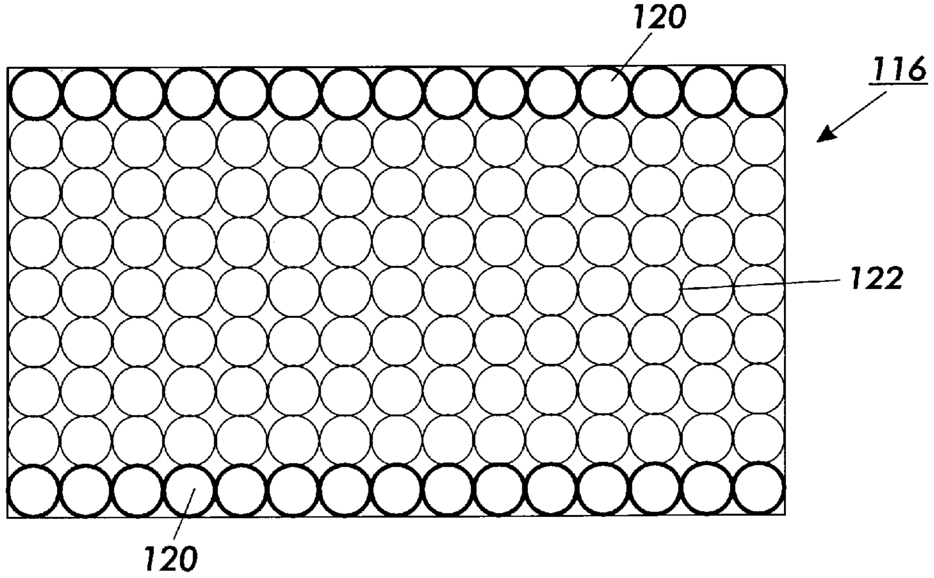
FIG. 2 is an enlarged sectional elevational view taken along the line in the direction of the arrows 2—2 of FIG. 1.

Referring now to FIG. 2, carbon fibers 116 are arranged in a rectangular array with the outer layers being of a high electrical resistance and the inner layer interposed between the outer layers being of a low resistance. One skilled in the art will appreciate that the carbon fibers may be arranged in an oval arrangement. Thus, the rectangular array of carbon fibers is a trilayer structure. As shown in FIG. 2, outer layers 120 include carbon fibers having a high electrical resistance ranging from about $10^4$ to about $10^{13}$ ohm-cms. The low resistance carbon fibers 122 have an electrical resistance ranging from about $10^2$ ohm-cms to about $10^{-5}$ ohm-cms. Preferably, the layer of low resistance carbon fibers 122 ranges from about 1 mm to about 3 mm thick and the layers of high resistance carbon fibers 120 range from about 0.001 mm to about 1 mm thick. The carbon fiber brush formed by these fibers ranges from about 10 to 15 mm wide and is about 7 mm long and ranges from about 3 mm to about 5 mm thick. From about 20% to about 99.9% of the fiber length is enclosed by support 118.

Figure 3:
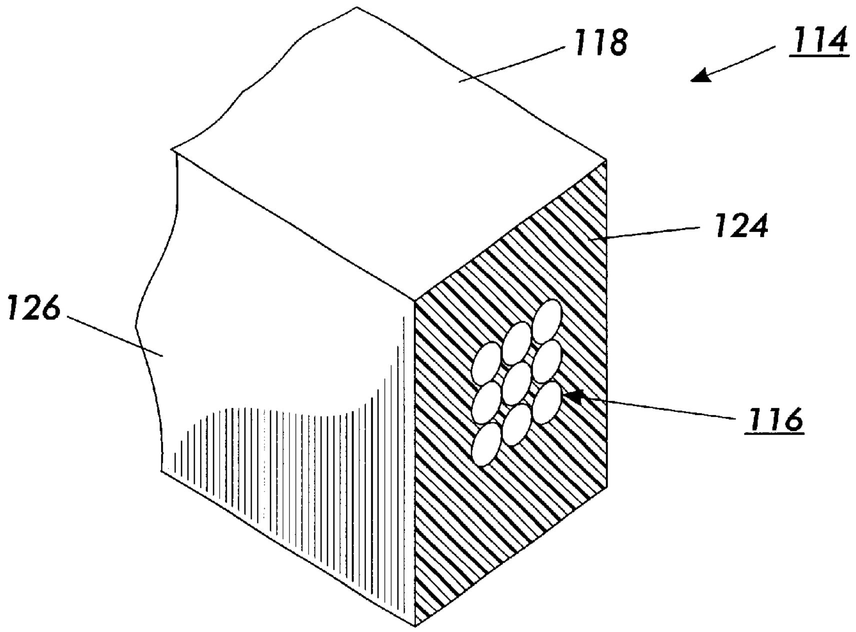
FIG. 3 is a perspective view of a portion of the FIG. 1 brush in one of its manufacturing stages.
Figure 4:
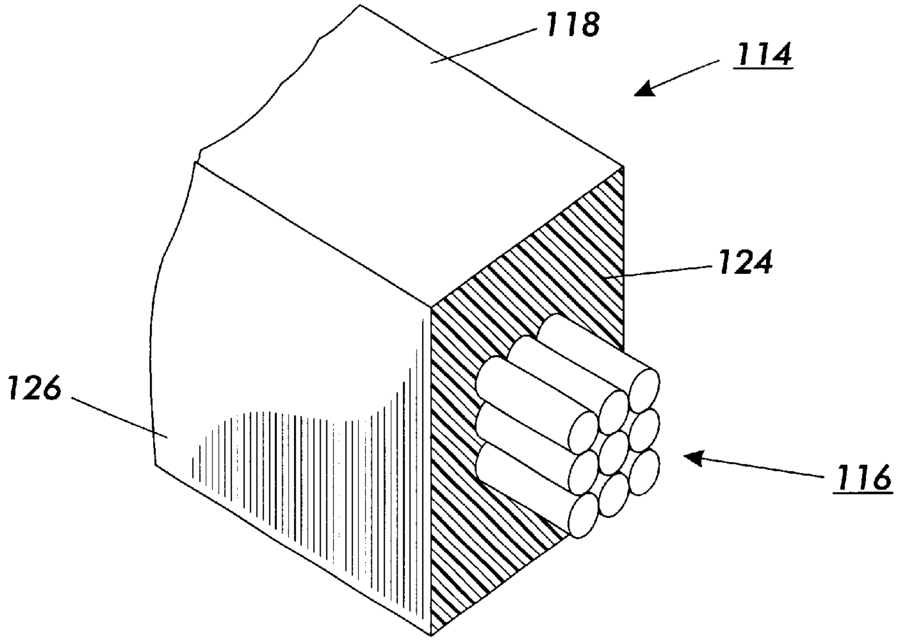
FIG. 4 is a perspective view of the FIG. 1 commutator brush in another stage of its manufacture.

Referring now to FIGS. 3 and 4, there is shown the commutator brush 114 during a manufacturing process. Turning initially to FIG. 3, commutator brush 114 is formed by an insert molding process or other suitable process. Carbon fibers 116 are encased in a resin 118 of the type heretofore described. The commutator brush is then cut into two identical pieces, one of which is shown in FIG. 4, with a laser beam along the front surface 124 and the rear surface 126. Thereafter, a conductive adhesive is applied to rear surface 126 to bond carbon fibers 116 and serve as a distribution electrode. Preferably, the conductive adhesive includes a silverprint, conductive metal filled ink, conductive carbon particle ink, and/or conductive epoxy. However, one skilled in the art will appreciate that any suitable conductive adhesive would function satisfactorily. For example, silver powder, aluminum flake, gold powder, as well as carbon black filled adhesives or coatings may also be employed for this use. In addition, epoxys, polyurethanes, and other types of conductive adhesives may work as well. In the molding process, carbon fiber tows, preferably preconfigured as three layers, is fed into the mold. Thereafter, the thermoplastic resin is injected into the mold, and the fibers are locally encased by the thermoplastic resin. The brush is then cut along the front and rear surfaces and a conductive adhesive applied to the rear surface to bond the conductive fibers.

Referring now to FIG. 4, the front face 124 is then cold cut to enable conductive fibers 116 to extend outwardly therefrom. By cold cutting, it is meant that the temperature of the carbon fibers does not exceed a maximum of 300° C., preferably 250° C. In this way, the carbon fibers are not overheated. This avoids the effect of overheating carbon fibers resulting in a decrease in the resistivity and a weakening of the mechanical properties of the wire. Both of these effects are clearly undesirable in a commutator brush being employed in a development unit of the type heretofore described. The laser operates at a wavelength ranging from about 154 nm to about 550 nm. Preferably, an excimer laser is employed which operates at a wavelength of about 248 nm. One skilled in the art will appreciate that other types of lasers may also be employed. Any of the pulsed ultraviolet laser light sources are preferable. The type of laser used must be such that cold cutting is used so as to minimize the deleterious effects on the carbon fibers.

In recapitulation, it is evident that the commutator brush of the present invention includes carbon fibers encased in a resin matrix or extending therefrom, with the carbon fibers being cold cut by a laser beam so as to minimize heating thereof. This commutator brush is in wiping contact with electrodes on a donor roll used in a development system of an electrophotographic printing machine. While this invention has been described in conjunction with a preferred embodiment and method of manufacture thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An electrical component having at least one end for electrically contacting another component, including:

a support; and a plurality of electrically conductive fibers having at least a portion thereof extending outwardly from said support to form a brush like structure having a free end adapted to contact the other component with the free end being cold cut by a laser beam operating at a wave length ranging from about 150 nm to about 550 nm so as to minimize heating of the fibers being cut so that the laser beam heats the fibers during cold cutting to a maximum of about 300° C.

2. An electrical component according to claim 1, wherein said fibers include carbon fibers.

3. An electrical component according to claim 2, wherein said fibers include:

a layer of high resistance fibers; and a layer of low resistance fibers adjacent said layer of high resistance fibers to form a layered structure.

4. An electrical component according to claim 3, wherein said layered structure is in a substantially rectangular shape.

5. An electrical component according to claim 3, wherein said high resistance fibers have an electrical resistance ranging from about $10^4$ to about $10^{13}$ ohm-centimeters.

6. An electrical component according to claim 3, wherein said low resistance fibers have an electrical resistance ranging from about $10^3$ ohm-centimeters to about $10^{-5}$ ohm-centimeters.

7. An electrical component according to claim 1, wherein a conductive adhesive secures the fibers of the end portion opposed from the free end portion to one another.

8. An electrical component according to claim 1, wherein said support includes a resin material surrounding a portion of said brush.

9. An electrical component according to claim 8, wherein the portion of said brush surrounded by said resin material ranges from about 20% to about 99.9% of said brush.

10. A method of making an electrical component having at least one end for electrically contacting another component, including:

feeding a plurality of carbon fiber layers into a mold;

surrounding the carbon fibers layers in the mold with a resin material;

cutting the carbon fiber layers along opposed front and rear faces;

applying a conductive adhesive to the rear face to bond the carbon fibers to one another; and cold cutting the front face with a laser beam operating in a wave length ranging from about 154 nm to about 550 nm to cut the fibers at a maximum temperature of about 300° C. so as to form a brush contacting region.

11. A method according to claim 10, wherein said feeding of the plurality of carbon fibers includes:

selecting a layer of high resistance carbon fibers; and selecting a layer of low resistance fibers and positioning said layer of low resistance carbon fibers adjacent said layer of high resistance carbon fibers.

12. A method according to claim 11, further including arranging the layer of high resistance carbon fibers and the layer of low resistance carbon fibers in a rectangular shape.

13. A method according to claim 11, wherein said selecting the first and second layers of high resistance fibers includes selecting the high resistance carbon fibers to have an electrical resistance ranging from about $10^4$ ohm-centimeters to about $10^{13}$ ohm-centimeters.

14. A method according to claim 11, further including selecting the third layer of low resistance carbon fibers having an electrical resistance ranging from about $10^3$ ohm-centimeters to about $10^{-5}$ ohm-centimeters.

15. An apparatus for depositing developer material on a surface to develop a latent image recorded thereon, including:

a donor roll, spaced from the surface and adapted to advance developer material to the latent image recorded on said surface;

a plurality of electrodes disposed on said donor roll; and a commutator contacting said electrodes along a portion of the exterior circumferential surface of said donor roll, said commutator comprising a plurality of electrically conductive fibers to form a brush like structure having a free end adapted to contact said electrodes with the free end being cold cut by a laser beam operating in a wave length ranging from about 154 nm to about 550 nm to cut the fibers at a maximum.

16. An apparatus according to claim 15, wherein said fibers include carbon fibers.

17. An apparatus according to claim 16, wherein said fibers include:

a layer of high resistance fibers; and a layer of low resistance fibers adjacent said layer of high resistance fibers to form a layered structure.

18. An apparatus according to claim 17, wherein said structure is in a substantially rectangular shape.

19. An apparatus according to claim 17, wherein said high resistance fibers have an electrical resistance ranging from about $10^4$ ohm-centimeters to about $10^{13}$ ohm-centimeters.

20. An apparatus according to claim 17, wherein said low resistance fibers have an electrical resistance ranging from about $10^3$ to about $10^{-5}$ ohm-centimeters.

21. An apparatus according to claim 15, wherein a conductive adhesive secures the fibers of the end portion opposed from the free end portion to one another.

* * * * *